United States Patent
Choi et al.

(10) Patent No.: US 8,804,828 B2
(45) Date of Patent: Aug. 12, 2014

(54) METHOD FOR DIRECT MODE ENCODING AND DECODING

(75) Inventors: Kwang-Pyo Choi, Anyang-si (KR); Yun-Je Oh, Yongin-si (KR); Young-Hun Joo, Yongin-si (KR); Byeung-Woo Jeon, Seongnam-si (KR); Bong-Soo Jung, Busan (KR); Kwang-Hyun Won, Bucheon-si (KR)

(73) Assignees: Samsung Electronics Co., Ltd (KR); Sungkyunkwan University Foundation for Corporate Collaboration (KR)

( * ) Notice: Subject to any disclaimer, the term of this patent is extended or adjusted under 35 U.S.C. 154(b) by 819 days.

(21) Appl. No.: 12/389,893

(22) Filed: Feb. 20, 2009

(65) Prior Publication Data
US 2009/0207914 A1    Aug. 20, 2009

(30) Foreign Application Priority Data
Feb. 20, 2008    (KR) .......................... 10-2008-0015566

(51) Int. Cl.
*H04N 7/50*    (2006.01)
*H04N 7/26*    (2006.01)

(52) U.S. Cl.
CPC ....... *H04N 7/26861* (2013.01); *H04N 7/26138* (2013.01); *H04N 7/26244* (2013.01); *H04N 7/26313* (2013.01); *H04N 7/26021* (2013.01); *H04N 7/50* (2013.01)
USPC .................................................... 375/240.15

(58) Field of Classification Search
USPC .................................................... 375/240.15
See application file for complete search history.

(56) References Cited

U.S. PATENT DOCUMENTS

| | | | | |
|---|---|---|---|---|
| 5,929,916 A * | 7/1999 | Legall et al. | ............ | 375/240.05 |
| 7,362,809 B2 * | 4/2008 | Booth et al. | ............ | 375/240.16 |
| 7,609,763 B2 * | 10/2009 | Mukerjee et al. | ........ | 375/240.16 |
| 7,706,442 B2 * | 4/2010 | Kuo | ......................... | 375/240.12 |
| 7,792,188 B2 * | 9/2010 | Tong et al. | .................... | 375/240 |
| 2004/0028282 A1 | 2/2004 | Kato et al. | | |
| 2004/0057515 A1 * | 3/2004 | Koto et al. | ............... | 375/240.14 |
| 2005/0013365 A1 * | 1/2005 | Mukerjee et al. | ........ | 375/240.16 |
| 2006/0280253 A1 * | 12/2006 | Tourapis et al. | ......... | 375/240.16 |

(Continued)

FOREIGN PATENT DOCUMENTS

| | | |
|---|---|---|
| EP | 1 406 453 | 4/2004 |
| JP | 2004-165703 | 6/2004 |

(Continued)

OTHER PUBLICATIONS

Tourapis et al.: "Direct Mode Coding for Bipredictive Slices in the H.264 Standard", IEEE Transactions on Circuits and Systems for Video Technology, Jan. 1, 2005.

(Continued)

*Primary Examiner* — Techane Gergiso
(74) *Attorney, Agent, or Firm* — The Farrell Law Firm, P. C.

(57) ABSTRACT

Disclosed is a method of encoding a direct mode when coding moving images, the method includes finding a prediction and a cost for each of a plurality of direct modes including a backward-based temporal direct mode and a forward-based temporal direct mode with respect to a current block to be encoded and determining one mode having the lowest cost as a result of comparing the costs as an optimal encoding mode, thereby performing encoding the direct mode.

9 Claims, 8 Drawing Sheets

(56) References Cited

U.S. PATENT DOCUMENTS

| | | | |
|---|---|---|---|
| 2007/0002948 A1* | 1/2007 | Shibahara et al. | 375/240.12 |
| 2007/0064800 A1* | 3/2007 | Ha | 375/240.12 |
| 2007/0217510 A1* | 9/2007 | Yamori et al. | 375/240.12 |
| 2008/0049837 A1* | 2/2008 | Tanaka et al. | 375/240.16 |
| 2008/0181308 A1* | 7/2008 | Wang et al. | 375/240.16 |
| 2008/0247467 A1* | 10/2008 | Rusanovskyy et al. | 375/240.16 |
| 2009/0074067 A1 | 3/2009 | Jeon | |

FOREIGN PATENT DOCUMENTS

| | | |
|---|---|---|
| KR | 1020040031556 | 4/2004 |
| WO | WO 03/026315 | 3/2003 |
| WO | WO 2007/074543 | 7/2007 |
| WO | WO 2008/007792 | 1/2008 |

OTHER PUBLICATIONS

Jeon: "Clean Up of Temporal Direct Mode", Joint Video Team (JVT) of ISO/IEC MPEG & ITU-T VCEG, Oct. 18, 2002.

Liu et al.: "Low Complexity Video Encoding Using B-Frame Direct Modes", Image and Video Communications and Processing 2005.

Joel Jung et al., "Competition-Based Scheme for Motion Vector Selection and Coding Information", ITU-Telecommunications Standardization Sector, Jul. 2006.

Study Group 16, Question 6, Video Coding Experts Group (VCEG), VCEG-AC06, Jul. 17, 2006.

* cited by examiner

METHOD FOR DIRECT MODE ENCODING AND DECODING

PRIORITY

This application claims priority under 35 U.S.C. §119(a) to an application entitled "Method for Direct Mode Encoding and Decoding" filed in the Korean Industrial Property Office on Feb. 20, 2008 and assigned Serial No. 10-2008-0015566, the contents of which are hereby incorporated by reference.

BACKGROUND OF THE INVENTION

1. Field of the Invention

The present invention relates to encoding and decoding of moving images, and particularly to a method for direct mode encoding and decoding of moving images.

2. Description of the Related Art

According to international standards for video compression, such as Motion Picture Experts Group (MPEP) MPEG-1, MPEG-2 and MPEG-4 standards defined by International Organization for Standardization/International Electrotechnical Commission (ISOIIEC) Joint Technical Committee 1 (JTC1) and H.26x standard by International Telecommunication Union-Telecom (ITU-T), there are a P-picture encoding method which refers to a past picture and a B-picture encoding method which refers to both a past picture and a future picture when predicatively encoding the movement of a current picture. Also, in order to increase coding efficiency, predictive coding is performed. Such predictive coding requires not only encoding a motion vector of a current block, but also using a motion vector of a neighboring block to reflect temporal and spatial connections to the motion vector of the neighboring block.

Therefore, in order to improve the coding efficiency of images, the precision of the motion vector and the resultant minimization of the motion prediction errors are important, and also the compression efficiency of motion vector data needs to be considered.

One example of the known methods that considers the compression efficiency of the motion vector data is a direct mode encoding method, which is largely divided into a temporal direct mode and a spatial direct mode. The temporal direct mode encoding method includes scaling a motion vector of the same position block of a backward reference picture temporally placed prior to a current picture and deriving a bidirectional motion vector of the corresponding block of the current picture from the motion vector of a backward reference picture if the motion vector of a backward reference picture points to a forward reference picture placed opposite the backward reference picture with respect to the current picture. The spatial direct mode encoding method includes obtaining a motion vector of blocks spatially close to a block to be encoded in the current picture and deriving a bidirectional motion vector from the obtained motion vector. The above two direct mode encoding methods show considerably higher coding efficiency because they do not require the transmission of a motion vector to a decoder. Hereinafter, the prior art direct mode encoding method will be described in detail.

FIG. 1 is a diagram for describing a temporal direct mode encoding method in encoding general moving images. Referring to FIG. 1, the prior art temporal direct mode encoding method includes obtaining a motion vector from the same position block of a backward reference picture and deriving a bidirectional motion vector by equally scaling the obtained motion vector with respect to temporal distance. Herein, the scaling is performed using Equations (1) and Equation (2).

$$mvFw_B = \frac{TD_B}{TD_P} \times mvFw_P \qquad (1)$$

$$mvBw_B = -\frac{TD_P - TD_B}{TD_P} \times mvFw_P \qquad (2)$$

In Equations (1) and (2), $TD_P$ denotes a temporal distance from a forward reference picture to the backward reference picture. $TD_B$ denotes a temporal distance from a current picture to a forward reference picture. The $mvFw_P$ is a motion vector of the same position block of the backward reference picture, and this motion vector points to the forward reference picture which is located in the opposite direction of the backward with respect to the current picture. The computation result from Equation (1), $mvFw_B$ is a forward motion vector with respect to a block of the current picture.

In Equation (2), variables $TD_P$, $TD_B$ and mvFw have the same meaning as those of Equation (1). The computation result from Equation (2), $mvBw_B$ is a motion vector in which a block of the current picture points to a backward reference picture.

In the temporal direct mode encoding method using Equations (1) and (2), if temporal correlation of images is greater than their spatial correlation, the coding efficiency becomes lower. Also, if the same position block of the backward reference picture is encoded as an intra block, which has no motion vector, such encoding is inefficient when calculating a direct mode motion vector.

FIG. 2 is a diagram for describing a spatial direct mode encoding method in encoding general moving images. Referring to FIG. 2, the prior art spatial direct mode encoding method makes use of spatial motion vector correlation of neighboring blocks, rather than temporal motion vector correlation. This method includes obtaining a motion vector from the spatially neighboring blocks with respect to a block of the current picture and deriving a bidirectional motion vector for the current block, using Equations (3) and (4).

$$mvFw_B = \text{median}(A_{Fw}, B_{Fw}, C_{Fw}) \qquad (3)$$

$$mvBw_B = \text{median}(A_{Bw}, B_{Bw}, C_{Bw}) \qquad (4)$$

In Equation (3), the variables $A_{Fw}$, $B_{Fw}$, and $C_{Fw}$ are forward motion vectors of blocks with their encoding ended, and refer to forward motion vectors of blocks spatially adjacent to a block to be encoded. Referring again to FIG. 2, $A_{Fw}$ forward motion vector is placed on the left side of the current block with respect to a spatial axis, $B_{Fw}$ forward motion vector is placed on the upper side of the current block, and $C_{Fw}$ forward motion vector is placed on the upper right side of the current block. Also, the median refers to the middle value function, and this function generally outputs the central value of input values which are sorted in an ascending order or in a descending order. The computation result from Equation (3) is a forward motion vector ($mvFw_B$) for a block of the current picture.

In Equation (4), the variables $A_{Bw}$, $B_{Bw}$, and $C_{Bw}$ are backward motion vectors of blocks with their encoding ended, and refer to backward motion vectors of blocks spatially adjacent to a block to be encoded. Herein, $A_{Bw}$ backward motion vector is placed on the left side of the current block with respect to a spatial axis, $B_{Bw}$ backward motion vector is placed on the upper side of the current block, and $C_{Bw}$ backward motion vector is placed on the upper right side of the current block. The median performs such a function as described in Equation (3). The computation result from Equation (4) is a backward motion vector ($mvBw_B$) for a block of the current picture.

The described temporal or spatial direct mode encoding method can predict the motion of images according to their attributes through using the characteristics of temporal and spatial correlations. Therefore, the number of the bits of the motion vector can be considerably reduced by encoding only the residual value of a block and block information, without encoding of the very motion vector.

As described above, the prior art direct mode encoding methods using temporal correlation and spatial correlation can effectively reduce the number of bits in bidirectional prediction since there is no need to transmit a motion vector. However, if a distance between the current picture and the backward reference picture increases with respect to the temporal axis, the prediction capability by deriving a motion vector decreases. Also, even if the corresponding block of the backward reference picture is encoded as an intra block, a motion vector of the direct mode is calculated just by considering it as a (0, 0) motion vector. In addition, if the motion characteristic of images between a forward reference picture and a backward reference picture is not primarily defined by the backward reference vector, a residue value increases and thus coding efficiency significantly decreases because a motion vector having a lower correlation is used.

SUMMARY OF THE INVENTION

Accordingly, the present invention has been made to solve at least the above-mentioned problems occurring in the prior art, and the present invention provides a selective direct mode encoding method and a selective direct mode decoding method, which can derive a more precise motion vector and thus reduce the number of bits required in a residue value, thereby performing an efficient direct mode coding.

Also, the present invention provides a method for a direct mode encoding to select an optimal mode from direct modes by considering the correlation characteristic of images, thereby performing an efficient motion vector coding, and a method for direct mode decoding.

In accordance with an aspect of the present invention, there is provided a method including calculating a motion vector of a current block by obtaining a motion vector of the same position block of a backward reference picture with respect to the present reference picture, considering temporal correlation; calculating a motion vector of the current block by obtaining a motion vector of the same position block of a forward reference vector; calculating a motion vector of the current block by using a motion vector of neighboring blocks with respect to a block of the present reference picture, considering spatial correlation; and selecting an optimal mode.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
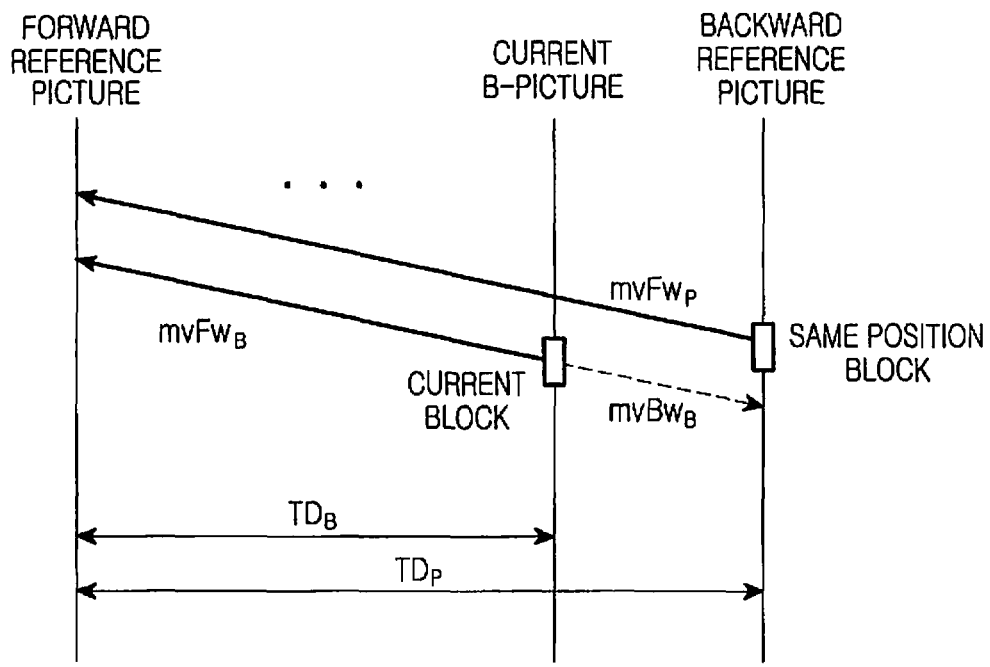
FIG. 1 is a diagram showing a temporal direct mode encoding method in coding general moving images.
Figure 2:
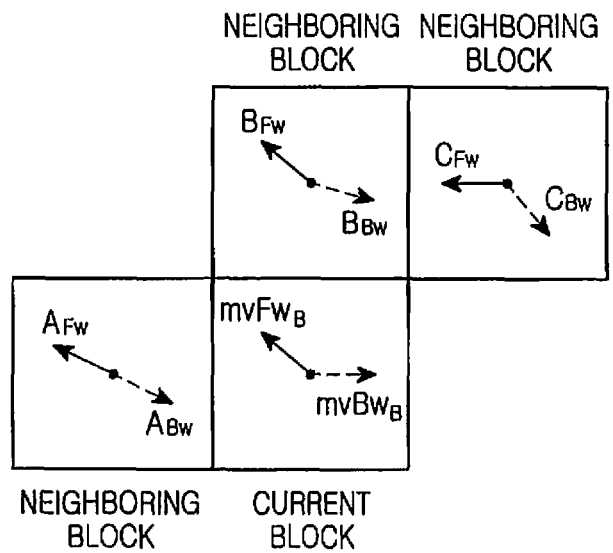
FIG. 2 is a diagram showing a spatial direct mode encoding method in coding general moving images.

Hereinafter, exemplary embodiments of the present invention will be described with reference to the accompanying drawings. In the following description, specific items such as components according to the present invention are shown, but this is intended to help the general understanding of the present invention, and it will be understood by those skilled in the art that various changes or modifications in the specific items may be made therein without departing from the scope of the invention.

As described above, the present invention relates to encoding and decoding in a direct mode. In the prior art encoding and decoding methods, if the same position block of the backward reference picture is encoded as an intra block, or correlation with the same position block of the forward reference picture is high, a motion vector is obtained and used only from the same position block of the backward reference picture and thus an incorrect motion vector is derived, generally causing an increase of coding bits of the direct mode and deteriorating coding performance. To solve these problems, the present invention selects and encodes in a direct mode with a higher coding efficiency of all direct modes including a backward-based or a forward-based temporal direct mode and spatial direct mode when calculating a direct mode of the current block, thereby improving coding efficiency of a residue value which is transmitted. Also, with the motion characteristic of images, the highest one in temporal correlation and spatial correlation is selected, and therefore the efficiency of encoding and decoding increases.

A method of encoding in a direct mode according to an embodiment of the present invention can be carried out by the following steps of:

(a) obtaining a motion vector from the same position block of a backward reference picture for a current block to be encoded in a temporal direct mode;

(b) deriving a bidirectional motion vector of the current block by scaling the obtained motion vector;

(c) calculating a cost for encoding a backward-based temporal direct mode using the bidirectional motion vector and two prediction blocks to which the bidirectional motion vector points;

(d) obtaining a motion vector from the same position block of a forward reference picture for a current block to be encoded in a temporal direct mode;

(e) deriving a bidirectional motion vector of the current block by scaling the obtained motion vector;

(f) calculating a cost for encoding in a forward-based temporal direct mode using the bidirectional motion vector and two prediction blocks to which the bidirectional motion vector points;

(g) obtaining a motion vector from neighboring blocks for the current block to be encoded in a spatial direct mode;

(h) deriving a bidirectional motion vector of the current block by scaling the obtained motion vector;

(i) calculating a cost for encoding in a spatial direct mode using the bidirectional motion vector and two prediction blocks to which the bidirectional motion vector points;

(j) selecting one direct mode having the lowest cost in the costs calculated from the steps (c), (f) and (i); and (k) signaling the direct mode selected from the step (j).

The bidirectional motion vector, which is derived by scaling a motion vector obtained from the same position block of a backward reference picture in a temporal direct mode in steps (a) and (b), is calculated using Equations (5) and (6) as in the general temporal direct mode shown in FIG. 1. Herein, a forward motion vector for the block of the current picture is $mvFw_B$, and a backward motion vector for the current block is $mvBw_B$.

$$mvFw_B = \frac{TD_B}{TD_P} \times mvFw_P \quad (5)$$

$$mvBw_B = -\frac{TD_P - TD_B}{TD_P} \times mvFw_P \quad (6)$$

The variables in Equations (5) and (6) are the same as the variables used in the prior art temporal direct mode.

Figure 3:
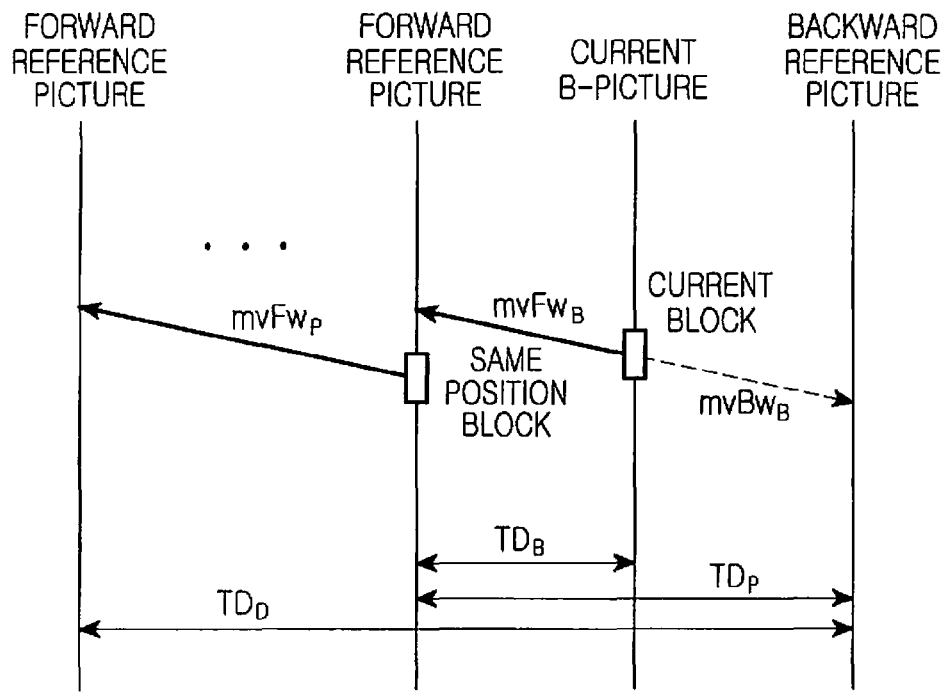
FIG. 3 is a diagram showing a temporal direct mode encoding method in coding moving images according to an embodiment of the present invention.

The bidirectional motion vector, which is derived by scaling a motion vector obtained from the same position block of a forward reference picture in steps (d) and (e) of the present invention, is calculated using Equations (7) and (8) as shown in FIG. 3.

$$mvFw_B = \frac{TD_B}{TD_D - TD_P} \times mvFw_P \quad (7)$$

$$mvBw_B = \frac{TD_P - TD_B}{TD_D - TD_P} \times mvFw_P \quad (8)$$

In Equation (7), $mvFw_P$ is a motion vector corresponding to the same position block of the forward reference picture, and this motion vector points to another forward reference picture. $TD_D$ refers to a distance from the backward reference picture to a forward reference picture, to which $mvFw_P$ motion vector points, with respect to a temporal axis. The meaning of variables of Equation (8) is the same as the variables of Equation (7).

The bidirectional motion vector, which is predicted by the current block of the spatial direct mode in steps (g) and (h) according to the present invention, is calculated using Equations (9) and (10).

$$mvFW_B = \text{median}(A_{Fw}, B_{Fw}, C_{Fw}) \quad (9)$$

$$mvBW_B = \text{median}(A_{Bw}, B_{Bw}, C_{Bw}) \quad (10)$$

Variables of Equations (9) and (10) have the same meaning as the variables used in the prior art Equations (3) and (4) in a spatial direct mode. Herein, $A_{Fw}$, $B_{Fw}$, $C_{Fw}$, $A_{Bw}$, $B_{Bw}$ and $C_{Bw}$ do not need to be placed in the above mentioned positions, but these variables can be implemented as modified formats without departing from the above characteristic in the case of neighboring blocks which is coding-ended with respect to the current block.

Also, if motion vectors having forward directivity from among motion vectors possessed by the neighbor blocks include one motion vector in an unavailable state, the motion vector in an unavailable state is set as any constant and its nature is converted into a motion vector in an available state, and subsequently the motion vector is input and calculated as an input value of Equation (9). Finally, a forward motion vector in the bidirectional motion vector can be obtained. The set constant includes a constant value representing that there is no motion, or a mean value and all the surrounding values thereof in the range of constant values that can be possessed by a motion vector. Also, if there are two unavailable state motion vectors, these unavailable state motion vectors are set as the same values as those of available state motion vectors and the nature is converted into an available state motion vector. Subsequently, the motion vector is input and calculated as an input value of Equation (9), and thus a forward motion vector in the bidirectional motion vector can be obtained. In the alternative, Equation (9) is omitted and in the first instance, a forward motion vector in the bidirectional motion vector the current block predicts can be replaced with an available motion vector. This method can be implemented as modified formats in a forward direction as well as in a backward direction without departing from the above characteristic.

The direct mode can not only be applicable to a fixed block size of N×N, but also can be applicable to various block sizes, such as N1×N2, as in the previous H.264 encoding standard.

A method of decoding in a direct mode according to an embodiment of the present invention can be carried out by the following steps of:

(a) determining whether a current block of B-picture is in a direct mode after decoding the current block from input bit stream;

(b) determining whether the current block is in a temporal direct mode or a spatial direct mode after reading signaling information, in the case of the direct mode;

(c) determining whether the current block is in a backward-based temporal direct mode or in a forward-based temporal direct mode after further reading information indicating that the current block is a temporal direct mode, in the case of the temporal direct mode;

(d) calculating a bidirectional motion vector of the current block after reading a motion vector of the same position block of a backward reference picture or a forward reference picture, if the current block is in the backward-based temporal direct mode or the forward-based temporal direct mode as a result of the determination in step (c);

(e) calculating a bidirectional motion vector of the current block after reading a motion vector of neighboring blocks closely adjacent to the current block, if the current block is in the spatial direct mode as a result of the determination in step (b);

(f) obtaining a bidirectional prediction reference block by using direct mode bidirectional motion vectors calculated in step (d) or step (e) and by applying a bidirectional prediction method; and (g) restoring the current block by adding the obtained prediction reference block and the residue block obtained from the input bit stream.

If the temporal direct mode restored in step (d) is backward-based, its bidirectional motion vector is calculated using Equations (11) and (12).

$$mvFw_B = \frac{TD_B}{TD_P} \times mvFw_P \quad (11)$$

$$mvBw_B = -\frac{TD_P - TD_B}{TD_P} \times mvFw_P \quad (12)$$

Variables of Equations (11) and (12) have the same meaning as previously defined herein.

If the temporal direct mode restored in step (d) is forward-based, its bidirectional motion vector is calculated using Equations (13) and (14).

$$mvFw_B = \frac{TD_B}{TD_D - TD_P} \times mvFw_P \quad (13)$$

$$mvBw_B = \frac{TD_P - TD_B}{TD_D - TD_P} \times mvFw_P \quad (14)$$

Variables of Equations (13) and (14) have the same meaning as the variables of Equations (7) and (8).

If the direct mode restored in step (e) is in a temporal direct mode, its bidirectional motion vector is calculated using Equations (15) and (16).

$$mvFw_B = \mathrm{median}(A_{Fw}, B_{Fw}, C_{Fw}) \quad (15)$$

$$mvBw_B = \mathrm{median}(A_{Bw}, B_{Bw}, C_{Bw}) \quad (16)$$

Variables of Equations (15) and (16) have the same meaning as previously defined herein.

A method of encoding a motion vector according to the present invention is similar to the characteristic of B (Bi-predictive) picture, and hereinafter, the B-picture will be described in detail.

The B-picture is not restricted by the fact that a motion compensation should be performed necessarily by using a past picture and a future picture. Therefore, a motion vector of the current block according to the B-picture is independent of time and direction. That is, the B-picture is obtained with reference to a plurality of pictures, so the motion vector of the current block can be encoded and decoded using 2 forward motion vectors and 2 backward motion vectors.

The B-picture has four kinds of motion compensation modes, and thus there are four kinds of motion vectors, which include a forward motion vector, a backward motion vector, a bidirectional motion vector (Bi-predictive) and a direct motion vector.

As described above, the motion vector of the current block according to the B-picture is independent of time and direction, and accordingly "forward" and "backward" are not necessarily discriminated by specific time and direction. Also, bidirectional does not need to be discriminated with a specific time or a specific direction to include the past and the future with respect to a point in time, or with respect to a specific position.

Figure 4:
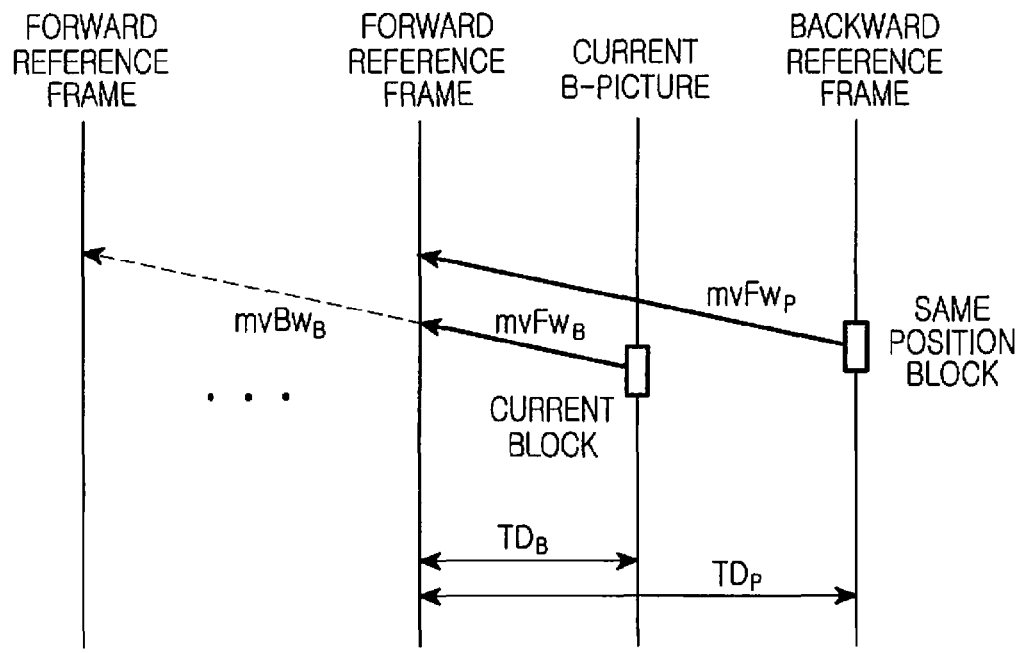
FIG. 4 is a diagram showing a predictive encoding method for 2 forward bidirectional prediction in a backward-based temporal direct mode.

FIG. 4 shows one example of predictive coding for two forward bidirectional predictions in a backward-based temporal direct mode. According to the present invention, the bidirectional motion vector is calculated using Equations (17) and (18).

$$mvFw_B = \frac{TD_B}{TD_P} \times mvFw_P \quad (17)$$

$$mvBw_B = mvFw_P \quad (18)$$

Figure 5:
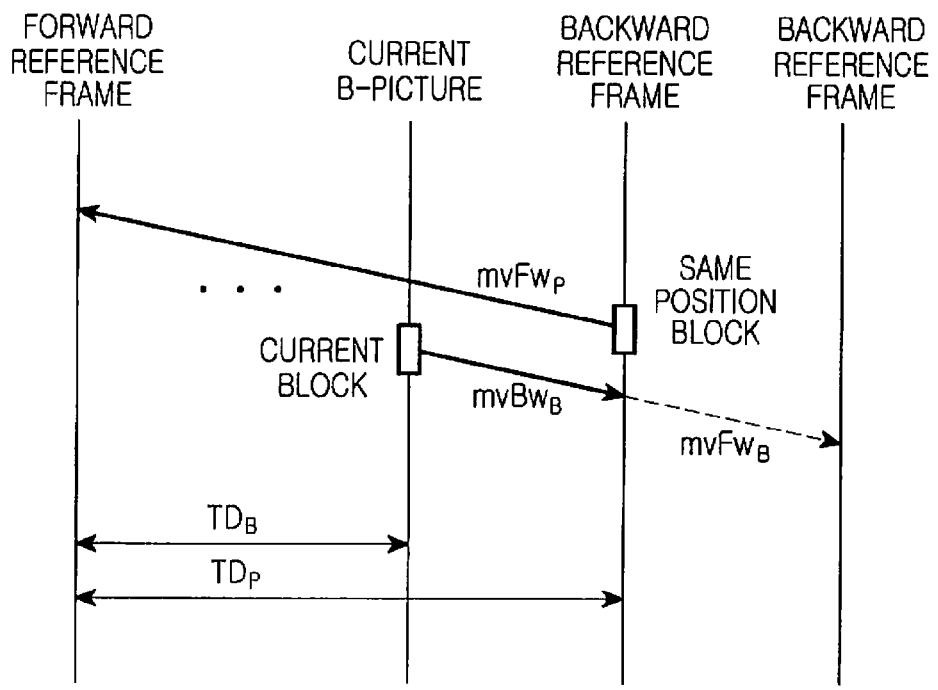
FIG. 5 is a diagram showing a predictive encoding method for 2 backward bidirectional prediction in a backward-based temporal direct mode.

FIG. 5 shows one example of predictive coding for two backward bidirectional predictions in a backward-based temporal direct mode. According to the present invention, the bidirectional motion vector is calculated using Equations (19) and (20).

$$mvFw_B = -mvFw_P \quad (19)$$

$$mvBw_B = -\frac{TD_P - TD_B}{TD_P} \times mvFw_P \quad (20)$$

Figure 6:
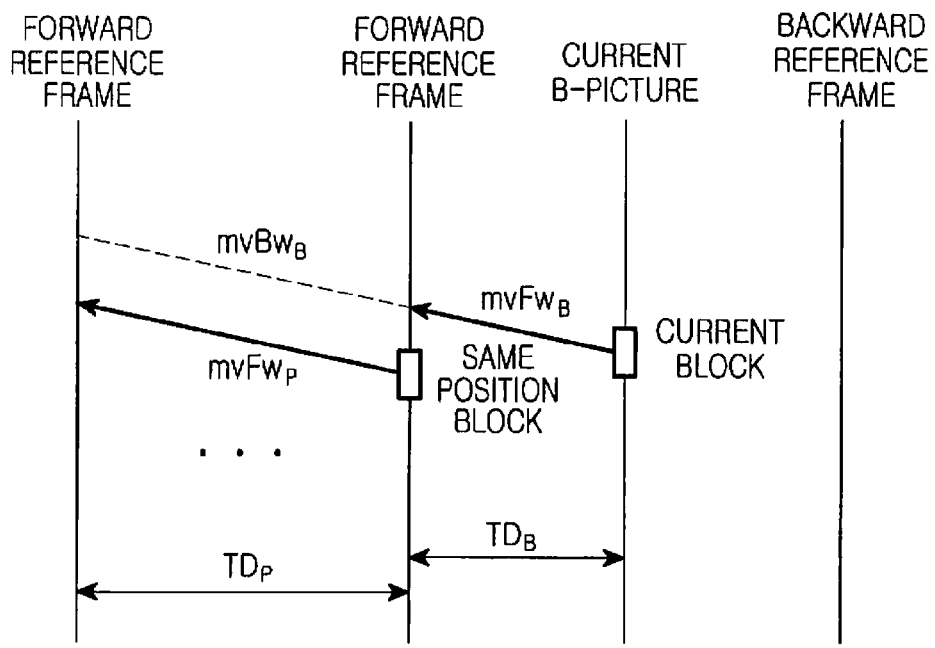
FIG. 6 is a diagram showing a predictive encoding method for 2 forward bidirectional prediction in a forward-based temporal direct mode.

FIG. 6 shows one example of predictive coding for two forward bidirectional predictions in a forward-based temporal direct mode. According to the present invention, the bidirectional motion vector is calculated using Equations (21) and (22).

$$mvFw_B = \frac{TD_B}{TD_P} \times mvFw_P \quad (21)$$

$$mvBw_B = \frac{TD_P + TD_B}{TD_P} \times mvFw_P \quad (22)$$

Figure 7:
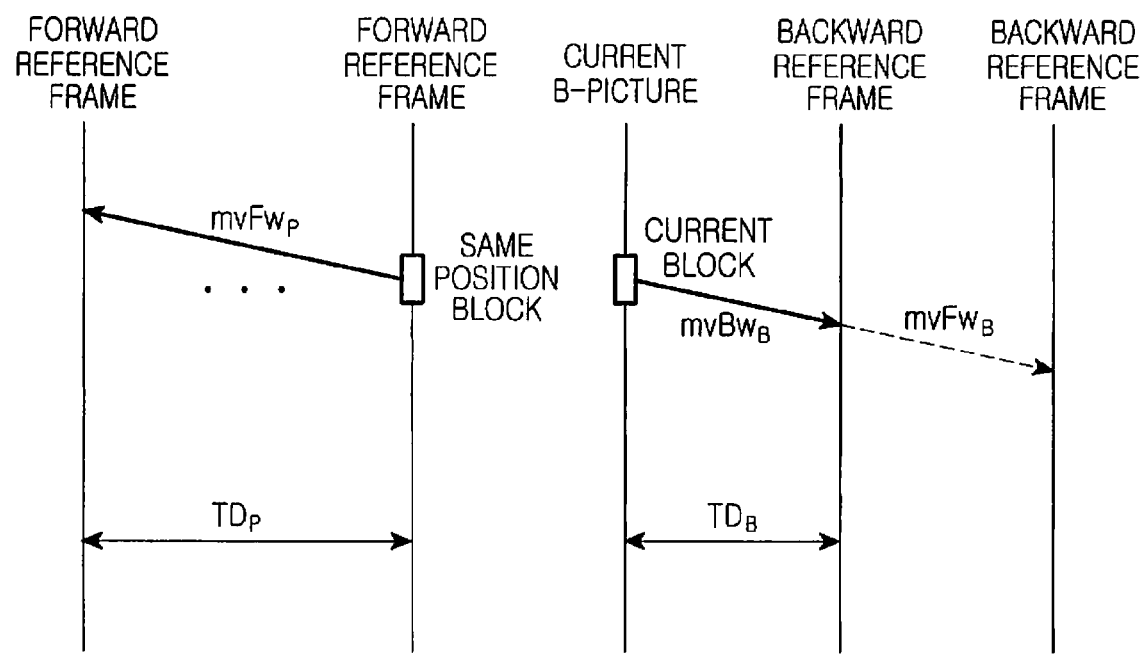
FIG. 7 is a diagram showing a predictive encoding method for 2 backward bidirectional prediction in a forward-based temporal direct mode.

FIG. 7 shows one example of predictive coding for two backward bidirectional predictions in a forward-based temporal direct mode. According to the present invention, the bidirectional motion vector is calculated using Equations (23) and (24).

$$mvFw_B = -mvFw_P \quad (23)$$

$$mvBw_B = -\frac{TD_B}{TD_P} \times mvFw_P \quad (24)$$

The direct mode encoding is also applicable to the B picture in the same way, and it will be understood that various changes in form can be made without departing from the scope of the present invention.

Hereinafter, a preferred embodiment of the present invention will be described in detail.

Figure 8:
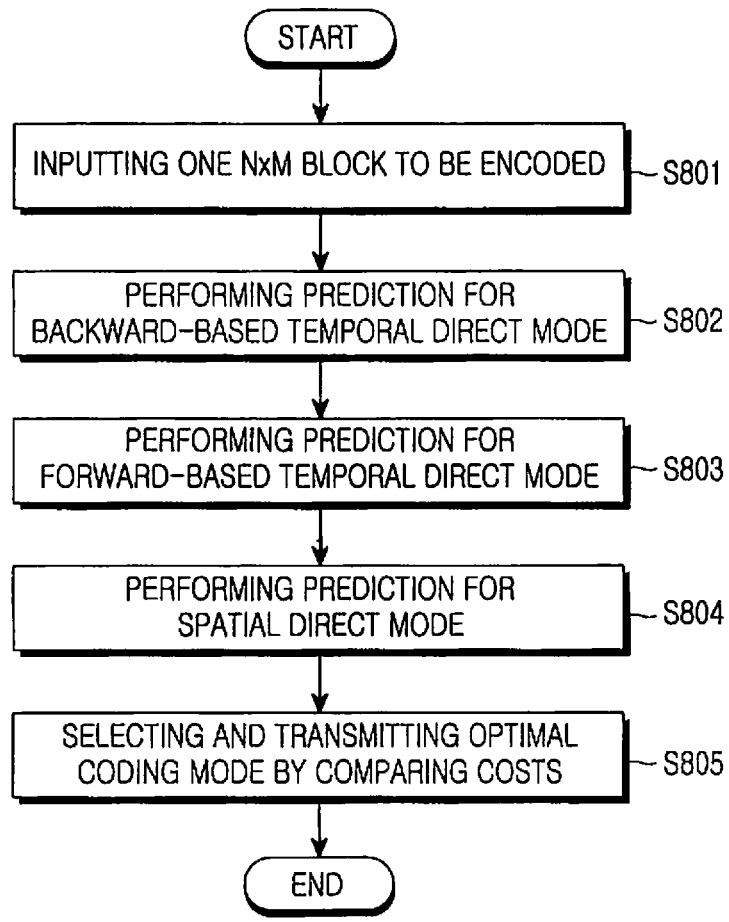
FIG. 8 is a flow chart of describing a bidirectional symmetric predictive encoding performed in an encoding device, according to an embodiment of the present invention.

FIG. 8 is a flow chart of describing a bidirectional symmetric predictive encoding performed in an encoding device, according to an embodiment of the present invention.

Referring to FIG. 8, one N×M block to be encoded is input in step 801. Then, a backward-based temporal direct mode is predicted and a cost for prediction is obtained in step 802. Herein, a block size of N×M includes all the cases that N is equal to M or N is different from M. Subsequently, a forward-based temporal direct mode is predicted and a cost for prediction is obtained in step 803. Then, a spatial direct mode is predicted and a cost for prediction is obtained in step 804. In the prediction of the temporal direct mode or in the prediction of the spatial direct mode, this procedure can be independently performed, and thus the procedure can be performed in parallel. In the spatial direct mode, any blocks adjacent to a current picture can be a candidate block, from which a motion vector can be obtained and used. It is to be understood that steps 802, 803 and 804 do not need to be performed in the order set forth in FIG. 8, but rather they can be performed as the steps of a modified form without departing from the scope of the present invention.

In step 805, the costs obtained through the steps are compared and thus the lowest case is determined as an optimal coding mode, and the determined coding mode is signaled to a decoder. Herein, one example of a signaling mode includes properly inserting several bits of information on the determined coding mode into the header of a block. Therefore, the decoder can understand if the current block is encoded in a backward-based temporal direct mode, in a forward-based temporal direct mode or in a spatial direct mode through this signaling information. Also, by choosing distortion having the lowest value or by calculating bit rate-distortion, the optimal direct mode from calculation of the cost can be determined.

Figure 9:
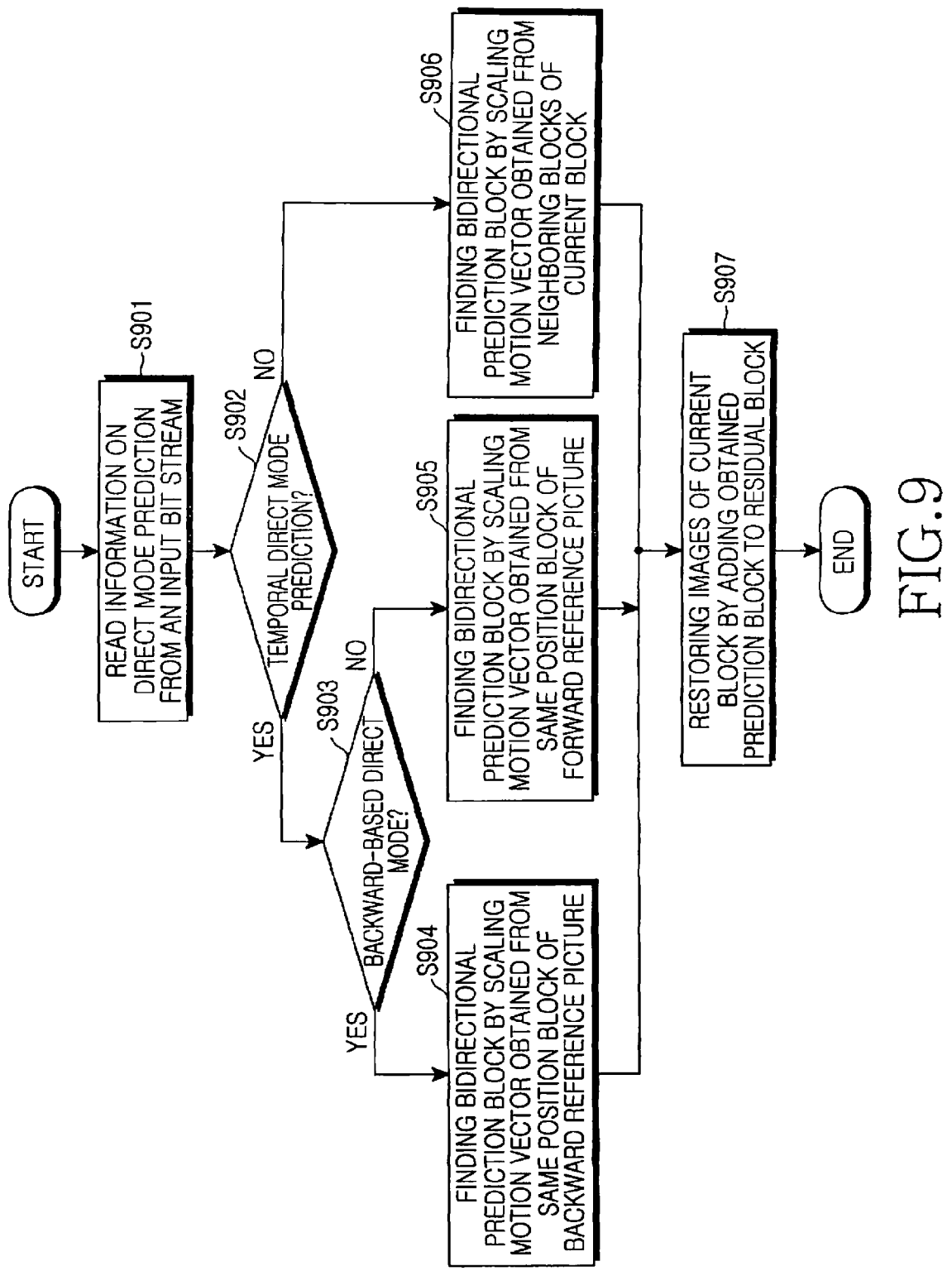
FIG. 9 is a flow chart of describing a bidirectional symmetric predictive decoding performed in an decoding device, according to an embodiment of the present invention.

FIG. 9 is a flow chart of describing a bidirectional symmetric predictive decoding performed in an decoding device, according to an embodiment of the present invention.

Referring to FIG. 9, a decoding device decodes in a direct mode according to the present invention, and the decoding device obtains a direct mode of a block to be decoded from an input bit stream in step 901 through 903. Herein, in the case of a backward-based direct mode, by obtaining and scaling a motion vector from the same position block of a backward reference picture and deriving a bidirectional motion vector, a bidirectional prediction block is acquired in step 904. Also, in the case of a forward-based direct mode, by obtaining and scaling a motion vector from the same position block of a forward reference picture and deriving a bidirectional motion vector, a bidirectional prediction block is acquired in step 905. In the case of a spatial direct mode, by obtaining a motion vector from neighboring blocks having a spatial correlation with the current block and deriving a bidirectional motion vector, a bidirectional prediction block is acquired in step 906. It is to be understood that the determination steps 901, 902 and 903 do not need to be carried out in the order set forth in FIG. 9, and can be performed as the steps of a modified form without departing from the scope of the present invention.

Subsequently, images of the current block are restored by adding the obtained prediction block and a motion prediction error signal block obtained from the input bit stream in step 907.

Figure 10:
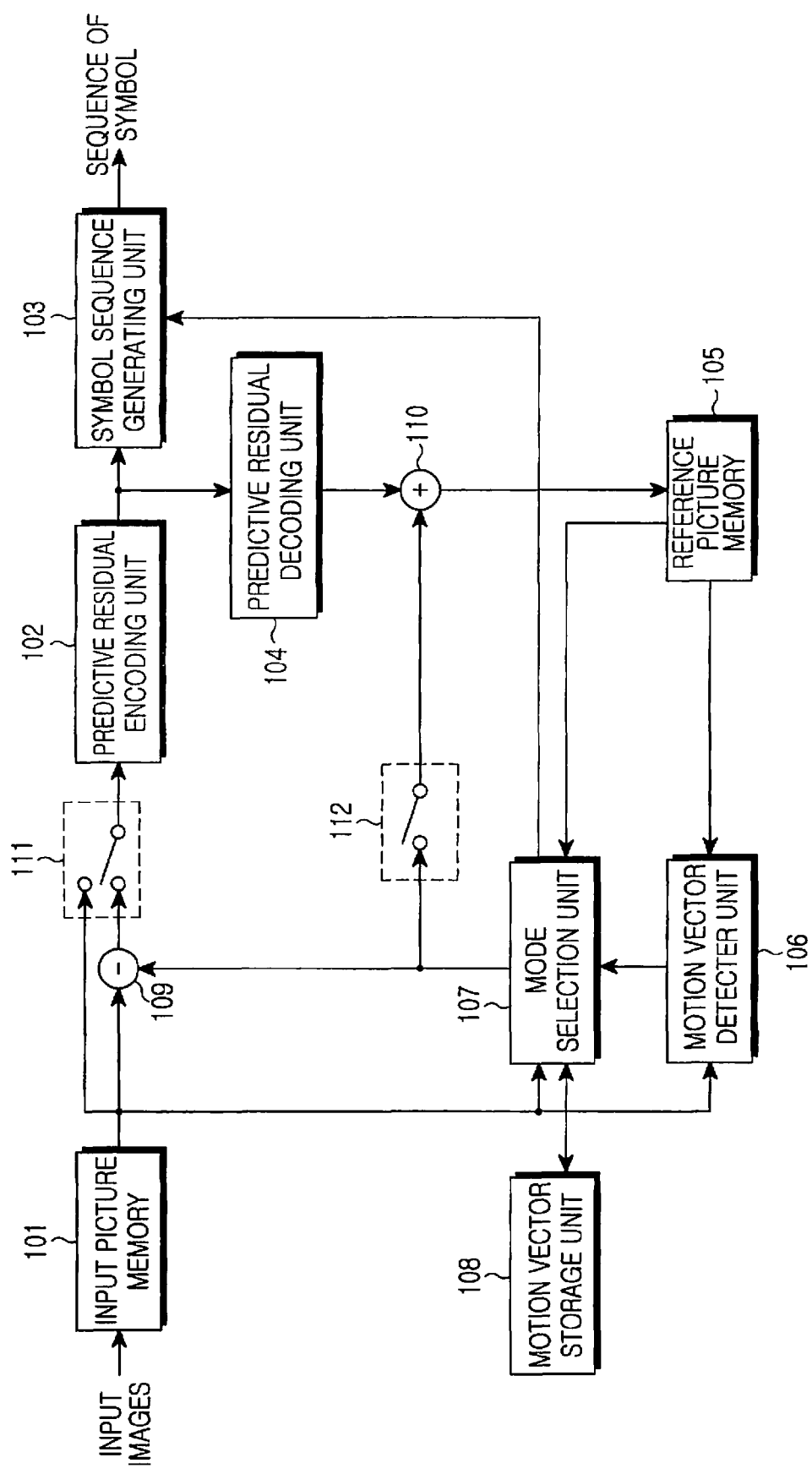
FIG. 10 is a schematic block diagram of an encoding device according to the present invention.

FIG. 10 is a schematic block diagram of an encoding device according to the present invention. Referring to FIG. 10, a method of operating the encoding device according to the present invention is described. Moving images to be encoded are input to an input picture memory 101 in a picture unit and then the moving images are arranged in an encoding progressive order. Each picture is divided into a group of pixels, which is called a block, for example 16 (horizontal)×16 (vertical) pixels and then processed in a block unit.

The block read from the input picture memory 101 is input to a motion vector detector unit 106. Herein, a motion vector of the block to be encoded is detected using a reference picture, wherein the reference picture can be images which are decoded from an encoded picture that is stored in a reference picture memory 105. Then, a mode selection unit 107 can determine a proper prediction mode with reference to the motion vector obtained from the motion vector detector unit or a motion vector from an encoded picture that is stored in a motion vector storage unit 108. The prediction mode obtained from the mode selection unit 107 and prediction images that are determined by the motion vector used in the prediction mode are input to a differential computing unit 109, and then predictive residual images are generated by obtaining a difference from the block to be encoded. The predictive residual images are then encoded in a predictive residual encoding unit 102. Also, the motion vector which is to be used in the prediction mode obtained from the mode selection unit 107 is stored in the motion vector storage unit 108 for use in encoding a subsequent block or picture. The above processing stream is performed if prediction encoding of a picture is selected, and a switch 111 performs the replacement to the prediction encoding of a picture. Finally, a symbol sequence generating unit 103 generates a sequence of symbols to be output from the encoding device, wherein the sequence of symbols is generated by performing variable-length coding of control information such as a motion vector and the like, image information output from the predictive residual encoding unit 102, etc. Also, a predictive residual decoding unit 104 then decodes the coding result from the predictive residual encoding unit 102. An adding unit 110 adds a predictive residue, which is the decoding result from the predictive residual decoding unit 104, to reference images provided from the mode selection unit 107 by a switch 112, in order to providing a decoded reference picture for the reference picture memory 105.

Preferably the motion vector detector unit 106 and the mode selection unit 107 can perform forward and backward temporal direct mode prediction as well as spatial direct mode prediction and thus determine optimal direct mode prediction.

Figure 11:
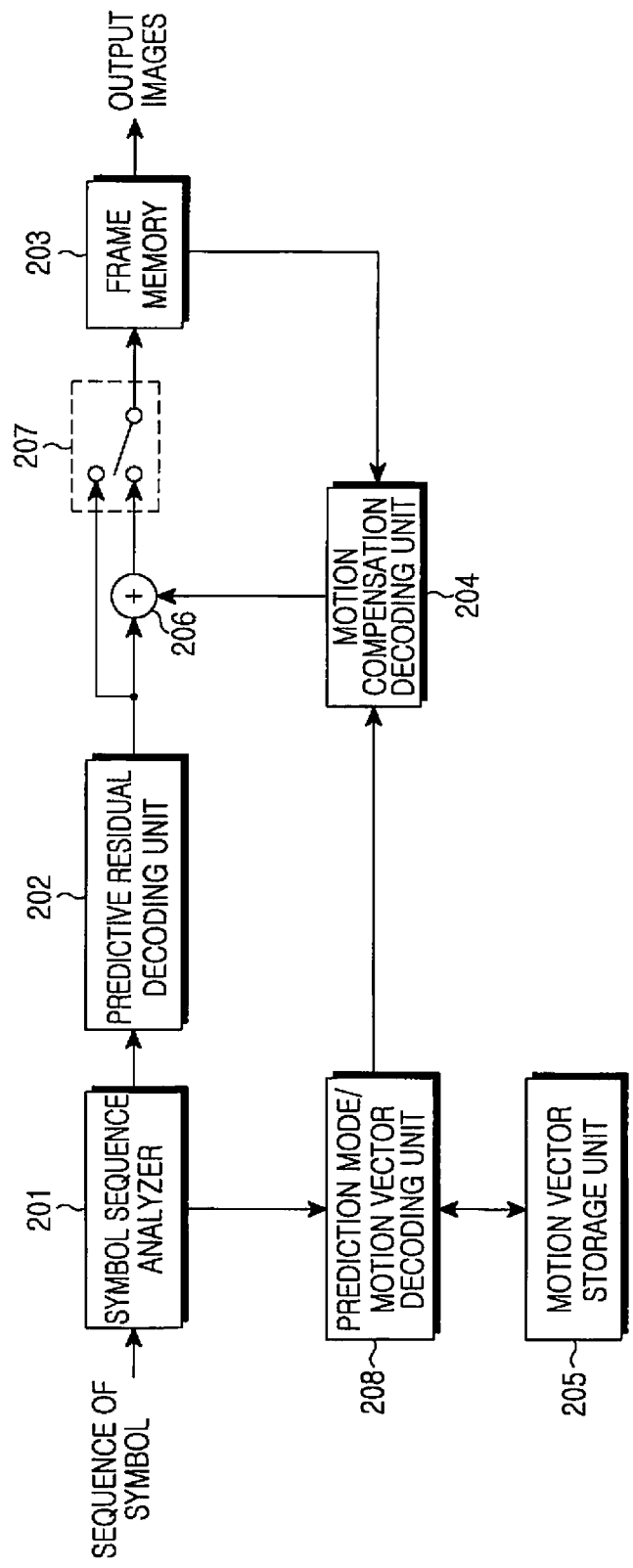
FIG. 11 is a schematic block diagram of a decoding device according to the present invention.

FIG. 11 is a schematic block diagram of a decoding device according to the present invention. Referring to FIG. 11, the operation procedure of a decoding device according to the present invention will be described.

The decoding device shown in FIG. 11 receives a sequence of symbols generated by the method of encoding images according to the present invention. Firstly, a symbol sequence analyzer 201 extracts prediction mode information, motion vector information, predictive residual encoding data, etc. from the input sequence of symbols.

The prediction mode or the motion vector information is output to a prediction mode/motion vector decoding unit 208, and the predictive residual encoding data is output to a predictive residual decoding unit 202. The prediction mode/motion vector decoding unit 208 performs decoding the prediction mode and decoding the motion vector which is used in the prediction mode. To decode the motion vector, a decoded motion vector which is stored in a motion vector storage unit 205 is used. The decoded prediction mode and the motion vector are output to a motion compensation decoding unit 204. Also, the decoded motion vector is stored in the motion vector storage unit 205 for use in decoding a motion vector of a subsequent block. The motion compensation decoding unit 204 generates prediction images according to the input prediction mode or motion vector information by using decoding-ended picture decoded images that are stored in a frame memory 203 as a reference picture. Accordingly, the generated prediction images are input into an adding unit 206, and then added to predictive residual images generated from the predictive residual decoding unit 202 for generating decoded images. The above operation procedure is performed in the case of a sequence of symbols resulting from prediction encoding of a picture, and a switch 207 performs the replacement to the decoding of the sequence of symbols resulting from prediction encoding of a picture.

As described above, a method of direct mode encoding and decoding according to an embodiment of the present invention can be carried out. While the invention has been shown and described with reference to certain exemplary embodiments thereof it will be understood by those skilled in the art that various changes in form and details may be made therein without departing from the spirit and scope of the invention. For example, the detailed description shows that the present invention can perform forward and backward temporal direct mode prediction and spatial direct mode prediction and determine one mode from the mode prediction. But another embodiment of the present invention can perform forward and backward temporal direct mode prediction and determine an optimal mode from the mode prediction without using a spatial direct mode. As such, various modifications and changes of the present invention can be made. Therefore, the present invention is not limited to the proposed embodiments, but may be defined by the appended claims and equivalents thereof.

What is claimed is:

1. A method for operating an encoder for encoding in a direct mode when coding moving images, comprising the steps of:
  receiving by the encoder input images to be encoded;
  storing said images in a memory;
  outputting from said memory a current block to be encoded;
  obtaining a prediction and a cost for each of a plurality of direct modes comprising a first temporal direct mode which uses a same position block located in a backward reference picture and a second temporal direct mode which uses a same position block located in a forward reference picture with respect to the current block to be encoded;
  determining one direct mode having a lowest cost as a result of comparing the costs as an optimal encoding mode;
  encoding a bit stream of the current block by the optimal encoding mode; and
  inserting information on the optimal encoding mode in the encoded bit stream.

2. The method as claimed in claim 1, wherein the plurality of direct modes further comprises a spatial based direct mode.

3. The method as claimed in claim 2, wherein the step of obtaining a prediction and a cost for the spatial based direct mode comprises:
  obtaining a motion vector from neighboring blocks for the current block;
  deriving a bidirectional motion vector of the current block by scaling the obtained motion vector; and
  calculating a cost for encoding a spatial based direct mode by using the bidirectional motion vector and two prediction blocks to which the bidirectional motion vector points.

4. The method as claimed in claim 1, wherein the step of obtaining a prediction and a cost for the first temporal direct mode comprises:
  obtaining a motion vector from the same position block located in the backward reference picture for the current block;
  deriving a bidirectional motion vector of the current block by scaling the obtained motion vector; and
  calculating a cost for encoding the first temporal direct mode using the bidirectional motion vector and two prediction blocks to which the bidirectional motion vector points.

5. The method as claimed in claim 4, wherein the step of obtaining a prediction and a cost for the second temporal direct mode comprises:
  obtaining a motion vector from the same position block located in the forward reference picture for the current block;
  deriving a bidirectional motion vector of the current block by scaling the obtained motion vector; and
  calculating a cost for encoding the second temporal direct mode using the bidirectional motion vector and two prediction blocks to which the bidirectional motion vector points.

6. The method as claimed in claim 5, wherein the bidirectional motion vector is defined by $$mvFw_B = \frac{TD_B}{TD_D - TD_P} \times mvFw_P;$$

and $$mvBw_B = -\frac{TD_P - TD_B}{TD_D - TD_P} \times mvFw_P,$$

where $mvFw_B$ and $mvBw_B$ indicate a forward motion vector and a backward motion vector for the current block, respectively, $mvFw_P$ indicates a motion vector corresponding to an identical position block of the forward reference picture, $TD_P$ indicates a temporal distance from the forward reference picture to the backward reference picture, $TD_B$ indicates a temporal distance from a current picture to the forward reference picture, and $TD_D$ indicates a temporal distance from the backward reference picture to a forward reference picture to which $mvFw_P$ motion vector points.

7. A method for operating a decoder for decoding in a direct mode when decoding moving images, comprising the steps of:
  receiving by the decoder an input bit stream to be decoded;
  obtaining a direct mode of a current block to be decoded based on information of an optimal encoding mode included in the input bit stream;
  finding a bidirectional prediction block by obtaining and scaling a motion vector from a same position block of a backward reference picture and thus deriving a bidirectional motion vector, in the case of a first temporal direct mode which uses the same position block located in the backward reference picture;
  finding a bidirectional prediction block by obtaining and scaling a motion vector from a same position block of a forward reference picture and thus deriving a bidirectional motion vector, in the case a second temporal direct mode which uses the same position block located in the forward reference picture; and
  restoring the current block by adding the prediction block found according to the first temporal direct mode or the second temporal direct mode and a residual block found from the input bit stream;
  wherein the optimal encoding mode is direct mode having a lowest cost as a result of comparing costs for each of a plurality of direct modes comprising the first temporal direct mode and the second temporal direct mode.

8. The method as claimed in claim 7, further comprising:
  finding a bidirectional prediction block by obtaining a motion vector from neighboring blocks having spatial correlation with the current block and thus deriving a bidirectional motion vector, if the current block is a spatial direct mode;
  restoring the current block by adding the prediction block found according to the spatial based direct mode and a residual block found from the input bit stream.

9. The method as claimed in claim 7, wherein the bidirectional motion vector is determined by when the current block is a forward-based direct $$mvFw_B = \frac{TD_B}{TD_D - TD_P} \times mvFw_P;$$

and $$mvBw_B = -\frac{TD_P - TD_B}{TD_D - TD_P} \times mvFw_P,$$

where $mvFw_B$ and $mvBw_B$ indicate a forward motion vector and a backward motion vector for the current block, respectively, $mvFw_P$ indicates a motion vector corresponding to the same position block of the forward reference picture, $TD_P$ indicates a temporal distance from the forward reference picture to the backward reference picture, $TD_B$ indicates a temporal distance from a current picture to the forward reference picture, and $TD_D$ indicates a temporal distance from the backward reference picture to a forward reference picture to which $mvFw_P$ motion vector points.

* * * * *